D. WHITEFORD.

Lamps.

No. 7,957. Reissued Nov. 20, 1877.

*Attest:*
D. R. Cowl
Lin Bacon

*Inventor:*
David Whiteford
by atty M. Bailey

N. PETERS, PHOTO-LITHOGRAPHER, WASHINGTON, D. C.

UNITED STATES PATENT OFFICE.

DAVID WHITEFORD, OF CHICAGO, ILLINOIS.

IMPROVEMENT IN LAMPS.

Specification forming part of Letters Patent No. 188,999, dated March 27, 1877; Reissue No. 7,957, dated November 20, 1877; application filed June 13, 1877.

*To all whom it may concern:*

Be it known that I, DAVID WHITEFORD, of Chicago, in the county of Cook and State of Illinois, have invented certain new and useful Improvements in Lamps; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to what is termed an "atmospheric lamp"—that is to say, a lamp in which one or more burners are combined with an elevated sealed reservoir or oil-fountain, from which oil is supplied to the burner only in proportion to its consumption at the latter point.

The particular kind of atmospheric lamp to which my invention, in the main, has reference is one in which the burner is carried by a tubular arm, through which it receives its supply of oil. In this part of my invention it has been my effort to adapt the lamp to the use of one or more curved or bent arms. The difficulty in the way of the use of such an arm, when connected directly to the sealed fountain, is that a trap is formed in its bend or curve, which prevents air from passing into the fountain, and consequently arrests the supply of oil to the burner.

To remedy this difficulty I combine with the fountain and its branching arm or arms a chamber intermediate between the two, which receives oil from the fountain, and supplies it to the arms, this intermediate chamber being so arranged that there will be practically no tendency to formation of vacuum in it. In this way the fountain, while still acting as the fountain of an atmospheric lamp, is not affected by the curvature of the arms, which, indeed, may be of any desired form and configuration.

Communication between the fountain and the intermediate chamber is controlled by a valve or cock, and it is much to be preferred that this valve or cock should be so combined with the stopper that closes the orifice through which the fountain is filled that the removal of the stopper shall cause the valve to close, and vice versa. An arrangement of a rotary valve for this purpose will hereinafter be described, this arrangement being applicable not only to my atmospheric lamp, but to atmospheric lamps in general.

The nature of my improvements, and the manner in which the same are or may be carried into effect, will be understood by reference to the accompanying drawing, in which—

Figure 1:
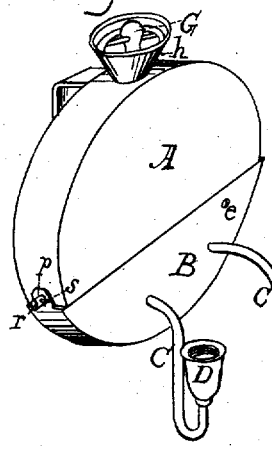
Figure 3:
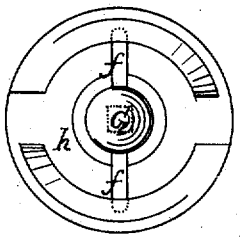
Figure 2:
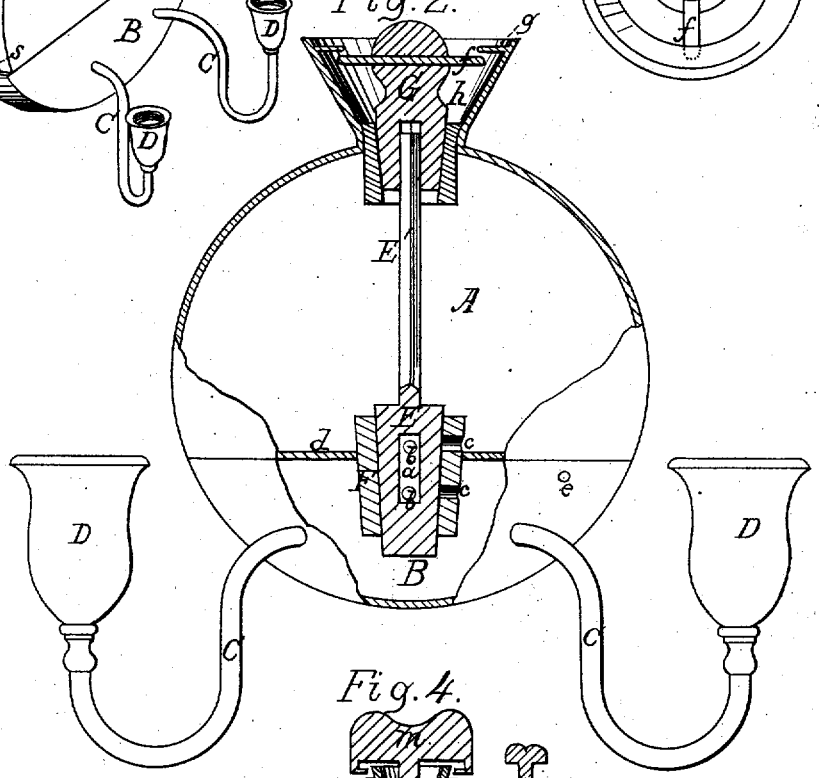
Figure 4:
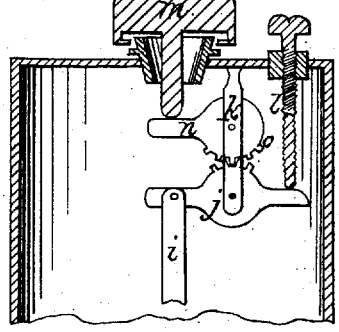

Figure 1 is a perspective view of a bracket or wall lamp embodying my invention. Fig. 2 is a vertical central section of the same. Fig. 3 is a top view of the funnel and stopper, enlarged. Fig. 4 is a section of a lamp containing modified forms of valve-operating devices.

A is the oil-fountain, below which is the intermed ate chamber B, from which branch the bent arms C, that carry the cups D, into which the burners are screwed.

The intermediate oil chamber or receptacle B can be made in one piece with, or permanently attached to, the fountain above, or it may be detachably connected therewith, thus constituting a removable cup or receptacle applied to the under side of the fountain, and capable of separation therefrom whenever desired. This latter construction is shown in Fig. 1 of the drawing.

In configuration the chamber is made to complete the cylindrical contour of the fountain. It is attached in a suitable manner to the fountain, in this instance by means of ears *p*, which catch over lugs *r* on the fountain, and can there be held by pins *s*, which pass through the lugs and over the ears.

Communication between the fountain A and chamber B is controlled by a plug-valve, E, which rotates in a seat, F, and is provided with a central passage, *a*, and two side openings, *b*, which are adapted to register with two like openings, *c*, in the valve-seat, the one opening being above and the other being below the bottom *d* of the fountain. When the valve is open oil flows through it into the chamber B below. The flow continues freely until the level of the oil in the chamber rises above the lower aperture *c*. When this takes place the fountain is sealed, and the oil will thenceforth pass from the fountain only in proportion as it is drawn from the chamber B. An opening, *e*, in the lower chamber, at a point above the level to which the oil will rise therein, admits air to the chamber, and allows the oil to flow freely to the burners through the bent arms C. This would not be so were the arms in direct communication with the sealed fountain, for in that case the oil in the bend of each arm would form a trap to prevent all entrance of air to the fountain, and consequently to prevent the proper supply of oil to the burners.

The valve E is provided with a vertical stem, E′, squared at its upper end, so as to fit in a corresponding socket in the stopper G. This stopper closes the filling-orifice, and is provided at its upper end with arms *f*, which extend under ribs *g* on the interior of a funnel, *h*, that surrounds the filling-orifice.

To remove the stopper it is rotated so as to bring its arms opposite the spaces intervening between the ribs *g*. This rotation of the stopper causes the valve E to rotate, so as to close the bottom of the fountain. The stopper is then removed, and the fountain may be filled. After this operation the stopper is replaced, and by again rotating it, so that its arms are brought under the ribs *g*, the valve is rotated, so as to again bring the fountain and chamber into communication.

The ribs *g* may be inclined or have a slight pitch, to cause the stopper to be more tightly jammed in the orifice when its arms are turned beneath the ribs.

I have described one way of arranging the valve. I am not restricted, however, to this arrangement, for any other arrangement for the purpose may be used, and the valve may be operated by means other than the stopper, although I much prefer the mode of operation last named, for obvious reasons.

In Fig. 4 I have represented two modifications, either of which may be used. The figure represents, in vertical section, the upper part of the oil-fountain. In this case the valve rises and falls instead of rotating, and its stem *i* is jointed to a lever, *j*, pivoted to a bracket, *k*, fixed to the top of the fountain. This lever may be directly acted upon by the inner elongated end of a screw-stopper, *l*, this arrangement being the same in substance as that described and claimed in a prior application for Letters Patent in my name, upon which application Letters Patent of even date herewith have been issued to me; or it may be acted on by the prolonged end of a central stopper, *m*, which requires for its use an intermediate lever, *n*, pivoted to the bracket *k*, above lever *j*, and provided at its center with a toothed sector, *o*, which gears with a corresponding toothed sector on lever *j*; or, in lieu of the above-suggested arrangement, the stem of the stopper may be screw-threaded, and arranged to screw into the stem of the valve, which should for this purpose be tubular and internally screw-threaded at its upper end.

In fine, any arrangement of valve or cock by which communication between the fountain and the intermediate chamber can be cut off automatically whenever the reservoir or fountain is opened may be used in carrying out my present invention.

The cups or wick-holders of the bent arms rise about as high as the level of the bottom of the fountain.

There may be a drip-cup below the intermediate chamber, if desired; but this, in practice, will not be found necessary.

Having thus described my improvements, what I claim, and desire to secure by Letters Patent, is—

1. The combination, in an atmospheric lamp, of these elements: an oil-fountain, a stopper for closing the filling-orifice in the fountain, a valve or cock for controlling the flow of oil from the fountain, caused to open when the stopper is inserted, and to close when the stopper is withdrawn, one or more burner-carrying bent or curved arms, and a chamber intermediate between the fountain and the arms, and communicating with the atmosphere, the combination being and acting as set forth.

2. The oil-fountain and the valve, adapted to rotate in a seat at the bottom of the fountain, in combination with the removable stopper which closes the filling-orifice, and is adapted to engage and operate the valve, as and for the purposes set forth.

3. The valve-operating removable stopper, in combination with the funnel surrounding the filling-orifice of the fountain, and the ribs on the interior of the funnel, substantially as and for the purposes set forth.

4. In combination with the oil-fountain, the removable intermediate oil chamber or receptacle, communicating with the atmosphere, arranged beneath the fountain and detachably connected therewith, and provided with arms leading to burners, substantially as shown and described.

In testimony that I claim the foregoing I have hereunto set my hand this 11th day of June, 1877.

DAVID WHITEFORD.

Witnesses:
ROBERT F. WINSLOW,
JOHN A. STEEN.